R. N. STEWART.
PROCESS FOR POWDERING CRANBERRIES.
APPLICATION FILED JUNE 3, 1915.
1,175,318.
Patented Mar. 14, 1916.
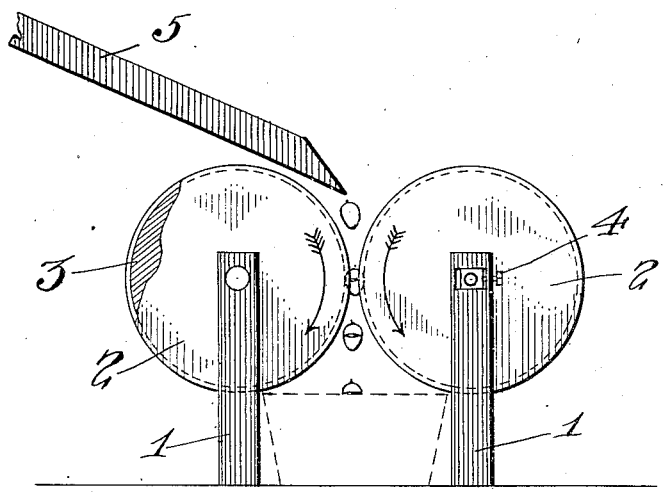
Witnesses
Inventor
Roy N Stewart
By Richard Owen,
Attorney

UNITED STATES PATENT OFFICE.

ROY N. STEWART, OF MIDDLEBORO, MASSACHUSETTS.

PROCESS FOR POWDERING CRANBERRIES.

1,175,318.  Specification of Letters Patent.  Patented Mar. 14, 1916.

Application filed June 3, 1915. Serial No. 31,912.

*To all whom it may concern:*

Be it known that I, Roy N. Stewart, a citizen of the United States, residing at Middleboro, in the county of Plymouth and State of Massachusetts, have invented certain new and useful Improvements in Processes for Powdering Cranberries, of which the following is a specification.

This invention relates to a process for powdering fruits and vegetables, especially cranberries.

An object of the invention is to reduce the cranberry, in its entirety to a powder, at the same time, saving the pure bouquet of the berry by a slow process of desiccation.

Another object of the invention is to maintain the powder from deterioration, for a maximum period of time, by only sufficiently bursting the berries to permit permeation of heated air therethrough, thereby absorbing moisture, but leaving the flavor of the berries intact.

In the drawing, an end elevational view of a pair of rollers, suitably mounted in frames, has been shown, illustrating the manner in which they are associated to burst the berries.

In the drawing, supporting members 1 are provided, in the upper terminals of which rollers 2 are rotatably mounted, each of which has an annular flange 3 formed on its opposite terminals to prevent casual displacement of the berries.

The berries are first graded in any suitable manner, until the various sizes of berries are segregated, permitting berries of a uniform size to be passed between the rollers, at one time. It will be noted that one of the rollers is adjustably mounted in its respective support 1, by a set screw 4, thereby permitting the roller to be adjusted, so as to sufficiently place the rollers at all times to conform to the size of berries being passed therethrough, since only surface contact of the rollers with the berries is desired, in order to crack the same. The berries after having been graded are passed through a trough 5, the outlet of the latter opening above the proximate peripheries of the rollers 2. It is seen that by passing the berries between the rollers 2 in the manner specified, that each berry will have but a single fissure in its surface which will provide an opening of sufficient depth to permit permeation of air through the berry, in order to dry the same. No difficulty will be incurred in bursting the berries, since it is well known that cranberries have a central cavity therein, and that the pulp of each of the berries adheres to the skin which as is likewise well known is of an impervious nature. It will be appreciated therefore that as soon as pressure is brought to bear upon the berry that the same will be cracked open, and it is to be understood that only sufficient pressure is to be exerted on the berry to crack the same without removing any of the moisture therefrom. After the berries have been passed through the rollers, 2, and burst open, the same are placed upon a fabric tray and placed in a heating medium which has reached a degree of sufficient intensity to evaporate the moisture, at the same time saving the full flavor. The entire berry including the skin, seeds and pulp are then ground, and it has been found upon an actual test that about 90% of the weight is lost from the berries.

It has been well known in the desiccation of cranberries to either crush the same or to slice them, after which they are put through a heating process which will evaporate moisture therefrom, permitting the same to be preserved for a considerable period of time. However, this has been found also undesirable, since before using the cranberries in this state, it is necessary to strain the same for removing the skin, which in view of its integrity, hardens under this process, likewise the seeds. The most healthful part of the cranberries is found to reside in the skin, and consequently it is undesirable to remove the same from the eatable product. It is furthermore to be understood that by merely cracking the berries as is done in this instance, that the same may be reused without powdering the same, and even to better advantage than where berries are mashed or sliced, since the skin of the berries is only sufficiently cracked to permit the entrance of air, and in view of the integrity of the skin, the latter will flex into its normal position just as soon as pressure is released therefrom, thereby causing the berries to assume an almost natural state, when immersed in water, after having been dried in this manner.

It is to be understood that in order to bring about the bursting of the berries, the rollers are rotated in opposite directions, and when in use are operated at a high rate of speed, thereby positively compressing each of the berries.

Having thus fully described my invention, what I claim as new and desire to secure by Letters Patent is:

1. A step in the process for preserving fruit consisting of passing the fruit through rollers to crack the fruit without crushing it.

2. A process for desiccating fruit consisting of passing fruit through rollers, to provide a fissure in the surface of the fruit, and placing the fruit in a heated atmosphere for drying the fruit.

3. A process for desiccating fruit consisting of passing fruit through rollers to provide a single interstice in the surface of the fruit, then placing the fruit in a heating element of low temperature to thoroughly permeate the fruit with the heated atmosphere for evaporating the moisture from the fruit.

4. A process for powdering cranberries consisting of passing the cranberries through rollers for cracking the berries, then placing the berries in a heating element of a low temperature to thoroughly dry the berries, but leaving the flavor intact and then grinding the berries to a powder.

5. A step in the process for preserving cranberries consisting of passing the cranberries through rollers sufficiently spaced to crack the berries without crushing them.

6. A process for preserving cranberries consisting of passing the cranberries through rollers sufficiently spaced to crack the berries without crushing them, and then placing the cranberries in a heated atmosphere.

In testimony whereof I affix my signature in presence of two witnesses.

ROY N. STEWART.

Witnesses:
M. E. WITBECK,
M. S. PHILBROOK.